Patented June 26, 1945

2,379,402

UNITED STATES PATENT OFFICE 2,379,402

COATING COMPOSITIONS

Herman A. Scholz, Evanston, John K. Wise, Chicago, Joseph W. Gill, Elmhurst, and Marvin T. Schmidt, Chicago, Ill., assignors to United States Gypsum Company, Chicago, Ill., a corporation of Illinois No Drawing. Application July 16, 1941, Serial No. 402,626

4 Claims. (Cl. 260—6)

The present invention relates to coating compositions comprising an aqueous emulsion containing dehydrated castor oil.

A primary object of the invention is to provide a coating composition of the water-thinnable type which may be sold either as a paste or in its final consistency and, if desired, may have incorporated therewith suitable pigments, fillers, and the like of well-known composition. The main purpose is the production of a paint having a greater degree of washability after drying than has hitherto been produced.

One of the outstanding features of this invention resides in the application of a drying oil, known as dehydrated castor oil, to the emulsion paint field, in which it has never before been employed. Dehydrated castor oil is a product which has been made by a number of different methods, most of which have been described in the patent literature, which comprise dehydration of the oil in the sense of removing therefrom the elements of hydrogen and oxygen so as to leave in the oil, or in the fatty acids of which the oil is mainly composed, a number of double bonds or linkages which convert the otherwise nondrying castor oil into an oil possessed of excellent drying characteristics.

The present invention is applicable most particularly to the production of what have come to be known in the art as emulsion paints, sometimes being termed resin emulsion paints. These consist of an aqueous continuous phase, usually containing dissolved therein certain colloidal materials such as gums or proteins, particularly the latter, in which continuous aqueous phase there is dispersed, in the form of discrete and individual minute droplets, an oily or hydrophobe phase, usually spoken of as the disperse phase of the emulsion. In addition to this hydrophobe disperse phase, there are usually also present fillers, pigments and modifying agents, which lend to the coating composition certain of their desirable characteristics, such as color, hiding power, tenacity of adhesion to the painted base, flexibility, light reflectivity, etc. It has already been proposed in the past to incorporate with the so-called water-thinnable paints certain hydrophobe materials such as oils or resins which, upon the application of such a paint to a given surface, will form thereon a film in which the pigments and fillers become embedded upon the drying of the film. In the case of paints which were devoid of a hydrophobe constituent, insolubility was sometimes imparted by the presence of more or less volatile solvents such as ammonia or by the use of solvents such as lime, which—while they solubilized certain of the proteins such as casein, vegetable protein, and the like—eventually reacted therewith to form a more or less water-resistant film. Such paints, however, usually did not show any great degree of resistance to washing, particularly under the effects of attrition, as when scrubbing them to clean them; and in the past, resort has been had to the use of hydrophobe materials which, by becoming incorporated in a colloid film such as the protein, gave them more or less resistance to washing. For this purpose there have been used various types of natural and synthetic resins either alone or in combination with oils, or in the form of resin-oil combinations generally known as varnishes, or combinations of synthetic resins which might themselves be modified so as to have drying characteristics, or which have been combined with oils having such characteristics.

One of the primary difficulties with an emulsion paint containing the ordinary drying oils lies in the fact that such paints, even though they might produce a certain degree of washability of the resulting paint film, suffer from the defect of gradually becoming more yellow in color in absence of light and air. This after-yellowing, particularly in the case of a white pigmented paint, is very undesirable.

It has also long been the object of the manufacturers of emulsion paints to produce a paint which after drying would lend itself to washing operations so that it might be cleaned, would be devoid of any disagreeable odors, and would not materially change in color on lapse of time.

The present inventors have now made the surprising discovery that by using in an emulsion paint the material known as dehydrated castor oil there will be produced an excellent form of water-thinnable paint which not only is devoid of disagreeable and repulsive odors but also exhibits remarkable resistance to washing and scrubbing and will not materially change in color. In other words, its tendency to after-yellow is greatly reduced. Now, it could not have been foreseen that the oil known as castor oil, which in itself is an entirely nondrying oil, would upon conversion into a drying oil possess any advantages which would differentiate it from the ordinary well-known drying oils, such as linseed oil, China-wood, tung oil, soybean oil, etc. The inventors have found, however, that the dehydrated castor oil lends to the emulsion paints or water-thinnable coating compositions many outstanding and valuable new characteristics, and it is to the utilization of this dehydrated castor oil in the field of emulsion paints or water-thinnable coating compositions that claim is laid.

The dehydrated castor oil may, if desired, form the sole hydrophobe constituent of the emulsion paints; or it may be used in combination with resins, both natural and synthetic; or it may be used in the form of varnishes made by "cooking" it with natural or synthetic resins. The resins employed may be of the type known as alkyd resins, but the invention is equally applicable to the use of dehydrated castor oil in combination with phenolic resins and other synthetic materials now known as well as with natural resins. The resins may be dissolved in the dehydrated castor oil either in the cold or with the aid of heat; or an emulsion may be made of the resin with the aqueous colloidal medium, to which there may then be added dehydrated castor oil, the combination or mutual solution of the two hydrophobe constituents then taking place upon the drying of the paint as the result of the evaporation of the water therefrom. Of course, the order of addition which is mentioned might well be reversed, and the dehydrated castor oil might be first emulsified with the aqueous phase of the emulsion and the resins thereafter likewise emulsified in the medium. In other words, what it is intended to imply by this statement is that the invention is broadly directed to coating compositions of the water-thinnable type which comprise dehydrated castor oil.

In its more specific aspects, the invention comprises water-thinnable compositions intended primarily as coating or impregnating compounds which contain varnishes made with dehydrated castor oil as the oily component or disperse hydrophobe phase of an aqueous emulsion in which the emulsifying agent is preferably of a colloidal type, as exemplified by proteins. Particularly applicable to the present invention are the proteins which are normally insoluble in water, such as vegetable proteins—for example, the alpha protein made from soybeans—and also that phosphoprotein known as casein, which is derived from milk. In using them, such proteins are dissolved in water with the aid of slightly alkaline-reacting so-called solvents, exemplified by borax, soluble phosphates, soluble silicates, alkaline reacting salts, and alkali or ammonium hydroxides. The production of aqueous solutions of such proteins need not be here described, as it is a very well-known procedure and has long been practiced in the art of making water-thinnable paints. These are referred to as water-soluble emulsifying agents.

Solely for purposes of illustration and without in any way wishing to limit the scope of the invention thereby, there will now be recited a number of examples of compositions which fall within the scope and purview of the present invention.

EXAMPLES

In order to demonstrate the unexpectedly great superiority of dehydrated castor oil alone in an emulsion paint, this material was tested against a paint containing no oil at all and also against paints containing other well-known drying oils, using for this purpose a well-known type of resin emulsion paint; that is to say, a paint consisting of solubilized casein and resin in emulsion form, mixed with the usual amount of pigment and fillers. These paints were made up, allowed to dry for five days, and then were subjected to the washability test by means of a machine adapted from that described in the publication of the United States Bureau of Standards known as Federal Standard Stock Catalog TT-P-23A, page 7. This machine comprises an oscillating arm bearing a brush which is moved in an oscillatory fashion over a surface to which the paint has been applied and on which it has been allowed to dry, water also being allowed to flow over the surface at a fairly uniform rate. The device is also provided with a counting mechanism which registers the number of strokes given by the brush. When the color of the substratum upon which the paint has been applied becomes visible to the extent of about half of the painted surface, the test is considered completed and a record is then made of the number of oscillatory strokes of the brush which were required to effect the removal of the given amount of paint. Obviously, therefore, the greater the number of strokes required, the better the resistance to washing or the better the degree of washability of the paint. With this explanation, the following table will become self-explanatory.

Table 1

| Oil added | Per cent | 5-day wash test in strokes |
|---|---|---|
|  | 0 | 500 |
| Dehydrated castor oil | 2 | 2,100 |
| Do | 4 | 2,750 |
| Bodied linseed oil | 4 | 1,600 |
| Bodied soybean oil | 4 | 500 |

From this table, it will be seen that the dehydrated castor oil, even when used by itself, greatly increased the washability of the paint.

As a further exemplification of the present invention, some examples will now be given of paints comprising combinations of alkyd resins with dehydrated castor oil, using in this case also certain well-known driers, such as lead and cobalt naphthenates, and using casein plus the necessary amount of alkaline solvents as the dispersing or emulsifying agent for the aqueous phase of the emulsion, the compositions also containing pigment such as lithopone and a filler such as mica.

Table 2

|  | Example No. | | |
|---|---|---|---|
|  | 1 | 2 | 3 |
| Alkyd resin | 100 |  | 300 |
| Dehydrated castor oil | 200 | 300 |  |
| Lead naphthenate | 2.6 | 2.6 | 2.6 |
| Cobalt naphthenate | 2.5 | 2.5 | 2.5 |
| Casein+alkaline solvents | 93.5 | 93.5 | 93.5 |
| Water | 541.5 | 541.5 | 541.5 |
| Lithopone | 1,500 | 1,500 | 1,500 |
| Mica | 100 | 100 | 100 |
| Water | (¹) |  |  |

¹ q. s. (about 200 parts are satisfactory).

The alkyd resins, oil and driers were mixed and then emulsified in the casein solution in the known fashiion. To the resulting emulsion were then added the amounts of pigments and fillers appearing in the table. The resulting paste paint was thinned to suitable consistency with water and applied to the standard test panels. The washability of the above paints was then determined, after they had been allowed to dry for five days, and the following results were obtained: Example 1, containing both the alkyd resin and the dehydrated castor oil, required 897,000 strokes; Example 2, containing the dehydrated castor oil alone, required 545,000 strokes; and Example 3, using the alkyd resin alone (this being for the purpose of comparison and not being within the scope of the present invention), required 330,000 strokes. From Table 2 it will thus be seen that the dehydrated castor oil yielded a product of greatly enhanced washability, which was still further enhanced by employing a combination of the dehydrated castor oil and the alkyd resin.

In order to show the applicability of the present invention to the field of other resins than those of the alkyd type, further examples will now be given. In order to produce these paints, two different types of varnishes were made, as follows:

*Varnish A.*—100 parts of a polyterpene resin were heated with 200 parts of dehydrated castor oil at a temperature within the range of from 150° to 160° C. until the resin had become entirely dissolved in the oil, whereafter the varnish was allowed to cool.

*Varnish B.*—100 parts of dehydrated castor oil were heated to about 200° C., whereafter there was dissolved in the oil 60 parts of an oil-soluble modified phenolic resin, the heat then being raised to 290° C. for about 30 to 35 minutes, whereafter 20 parts of dehydrated castor oil were poured into the mixture to check the reaction between the resin and the dehydrated castor oil. This varnish was then allowed to cool.

*Example 4.*—The following paint was made up, using the amounts given, which are in parts by weight:

| | |
|---|---|
| Varnish A | 300 |
| Lead naphthenate | 2.6 |
| Cobalt naphthenate | 2.5 |
| Casein+appropriate alkaline solvents | 93.5 |
| Water | 541.5 |

The driers mentioned were added to the varnish, and the resulting oil phase was then emulsified in the casein solution in the known manner. To the resulting emulsion there were added the following:

| | |
|---|---|
| Lithopone | 1,500 |
| Mica | 100 |
| Water | q. s. |

About 140 parts of water are satisfactory, although this amount will vary slightly, depending upon the degree of fluidity which it is desired to have in the finished product.

*Example 5.*—This example is exactly the same as Example 4, with the exception that varnish B (the one containing the phenolic resin) was substituted for varnish A, and the water finally added was about 225 parts instead of 140 parts.

*Example 6.*—A paint was made up exactly the same as in Examples 4 and 5, except that 300 parts of an alkyd resin alone were used as the hydrophobe component of the emulsion. In this example, therefore, no dehydrated castor oil was used, and this example therefore is not within the scope of the present invention but is given for the purpose of comparison.

The paints resulting from the formulation of Examples 4, 5 and 6 were then tested for washability as well as for yellowing, yielding the following results:

*Table 3*

| | Example No. | | |
|---|---|---|---|
| | 4 | 5 | 6 |
| Washability (after 3 days) strokes | 451,000 | 632,500 | 280,500 |
| 8-day yellowing coefficient | 0.14 | 0.29 | 0.71 |

In the above test, the eight-day yellowing coefficient was determined on a Hunter reflectometer.

The 8-day yellowing test is conducted by applying four coats of the paint in question, two coats per day, to a piece of plasterboard 6 inches wide by 16 inches long. Forty-eight hours after the fourth coat, apparent reflectance readings are taken on a Hunter Multipurpose Reflectometer (described in Bureau of Standards Research Paper No. R. P. 1345), which measures the 45° normal apparent reflectance, using three filters before the source of the light: amber, green, and blue. After the readings are taken, a band of aluminum foil 6 inches wide is placed around the panel so that one edge of the foil is about 4 inches from one end of the panel. The whole panel is then wrapped in cellophane about one mil in thickness and placed on a shelf, face out, in a room having numerous windows arranged in such a fashion that the panel is not exposed to direct sunlight but is exposed to subdued daylight. After eight days the wrappings are removed, and the amber, green and blue apparent reflectance readings are taken over the area exposed to light, as well as over the area protected from light by the aluminum foil. For convenience, a rather arbitrary unit of yellowness is used, the formula being $$Y = \frac{amber - blue}{green} \times 100$$

That is to say, the blue reflectance reading is subtracted from the amber reflectance, the difference is divided by the green reflectance, and the result is multiplied by 100, this yielding Y, which is the "yellowness." The difference between yellowness of the area kept from light and that exposed to light is termed the "yellowing coefficient." The higher the yellowing coefficient, the more the paint has yellowed.

It will also be seen that the washability of Examples 4 and 5 was greatly superior to that of Example 6. This increase in washability as compared with the alkyd resin alone is clearly attributable to the remarkable effects of the dehydrated castor oil.

In the above formulas, vegetable proteins such as soybean protein may be substituted for the casein, and the solvents employed may comprise borax or other alkali utilized with or without sodium stannate or other alkali salt of an amphoteric metal as a stabilizer.

No particular novelty is claimed for the aqueous component of the present paint formulations, in which however novelty resides primarily in the utilization of the dehydrated castor oil, either alone or conjointly with natural or synthetic resins or resinous condensation products.

The invention is, moreover, not limited to the previous preparation of a varnish from the resins and the oil, as the oil may be used in the cold to dissolve the resins or the oil and the resins may be separately emulsified in the aqueous phase of the emulsion, the main object in every case being to produce a finished product containing an aqueous solution of the protein as the continuous phase and a mixture or varnish containing dehydrated castor oil or dehydrated castor oil alone as the dispersed hydrophobe phase.

It will, of course, be obvious that the quantities and kinds of pigment shown in the examples may vary very widely, depending upon the color desired, and the lithopone is given merely as an example of white pigment. Obviously, various other pigments, such as titanium oxide, may be employed. In the case of color, certain colored pigments or even color lakes may be used.

Saving for themselves such equivalents as may occur to those skilled in the art and the adoption of such mechanical expedients as mixers, paint mills, etc., to insure adequate and uniform admixture of the various ingredients, the inventors claim:

1. A coating composition in the form of an emulsion comprising an aqueous solution of a protein as the continuous phase, and a hydrophobe disperse phase comprising dehydrated castor oil, which composition is characterized by forming a water-washable non-yellowing dry coating.

2. A coating composition in the form of an emulsion comprising an aqueous solution of a protein as the continuous phase, and a hydrophobe disperse phase comprising dehydrated castor oil and an artificial resin soluble in said oil, which composition is characterized by forming a water-washable non-yellowing dry coating.

3. The composition of claim 1 in which the protein is casein.

4. The composition of claim 1 in which the protein is a vegetable protein.

HERMAN A. SCHOLZ.
JOHN K. WISE.
JOSEPH W. GILL.
MARVIN T. SCHMIDT.